United States Patent
Su et al.

(10) Patent No.: US 8,125,550 B2
(45) Date of Patent: Feb. 28, 2012

(54) CORRELATION DOUBLE SAMPLING CIRCUIT FOR IMAGE SENSOR

(75) Inventors: Tsung-Yi Su, Hsin-Chu Hsien (TW); Han-Chi Liu, Hsin-Chu Hsien (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 320 days.

(21) Appl. No.: 12/209,199

(22) Filed: Sep. 11, 2008

(65) Prior Publication Data

US 2009/0213259 A1 Aug. 27, 2009

(30) Foreign Application Priority Data

Feb. 27, 2008 (TW) .............................. 97106789 A

(51) Int. Cl.
*H04N 3/14* (2006.01)
*H04N 5/335* (2011.01)
*H03N 1/12* (2006.01)

(52) U.S. Cl. ......................... 348/294; 348/308; 341/155

(58) Field of Classification Search .......... 348/294–308; 341/143, 155
See application file for complete search history.

(56) References Cited

U.S. PATENT DOCUMENTS

| 5,177,484 A * | 1/1993 | Bruckmann ................... 341/172 |
| 5,793,322 A * | 8/1998 | Fossum et al. ................. 341/161 |
| 2004/0012697 A1* | 1/2004 | Rossi ............................ 348/308 |
| 2006/0061675 A1 | 3/2006 | Kim |
| 2008/0079832 A1* | 4/2008 | Chou ............................ 348/302 |
| 2009/0027247 A1* | 1/2009 | Kumamoto et al. .......... 341/143 |

FOREIGN PATENT DOCUMENTS

| CN | 1747526 A | 3/2006 |
| JP | 2003234962 | 8/2003 |
| JP | 2005210335 | 8/2005 |
| TW | 200937951 | 9/2009 |

* cited by examiner

*Primary Examiner* — Sinh Tran
*Assistant Examiner* — Selam Gebriel
(74) *Attorney, Agent, or Firm* — Winston Hsu; Scott Margo

(57) ABSTRACT

A correlation double sampling (CDS) circuit for sampling a reset signal and a light-sensing signal outputted from a pixel column of an image sensor includes two sampling capacitors and four transistor switches. The operation of the CDS circuit needs not change polarities of the two sampling capacitors, such that MOS capacitors that have higher capacitance per unit area can be utilized for realizing the two sampling capacitors for reducing thermal noises induced when performing sampling. Additionally, fewer transistors are used in the CDS circuit, and thus charge injection noises caused by switching the transistor switches can also be reduced.

16 Claims, 4 Drawing Sheets

CORRELATION DOUBLE SAMPLING CIRCUIT FOR IMAGE SENSOR

BACKGROUND OF THE INVENTION

1. Field of the Invention

The present invention relates to a correlation double sampling circuit for an image sensor, and more particularly, to a correlation double sampling circuit having a simplified circuit structure and utilizing sampling capacitors that need not perform polarity inversion in operation for reducing noise.

2. Description of the Prior Art

As development of electronic products such as digital cameras and mobile phones progresses, the demand for image sensors increases accordingly. In general, image sensors in common usage nowadays are divided into two main categories: charge coupled device (CCD) sensors and CMOS image sensors (CIS). Primarily, CMOS image sensors have certain advantages of low operating voltages, low power consumption, and random access capability. Furthermore, CMOS image sensors are currently capable of integration with semiconductor fabrication processes. Based on those benefits, the application of CMOS image sensors has increased significantly.

Generally, the CMOS image sensor utilizes an analog front-end circuit to read out signals of each pixel sensor and to provide sufficient driving ability to drive rear-stage application circuits, such as analog to digital converters (ADCs) or image processors. In operation, a reset switch is utilized to reset the pixel sensor to an initial state for clearing remaining signals of a last operation. However, some reset noise may be injected when the reset switching is performed, and thus the industry further includes a correlation double sampling (CDS) circuit in the analog front-end circuit for separately sampling light-sensing signals and reset signals outputted from each pixel sensor, so that voltage level differences between the light-sensing signals and reset signals, i.e. the voltage level differences before and after exposure, can be obtained. Therefore, images of the CMOS image sensor can be isolated from impact of the reset noise.

Please refer to FIG. 1. FIG. 1 is a schematic diagram of a conventional CMOS image sensor 10. The CMOS image sensor 10 includes a pixel array 11, a CDS circuit array 12 and a rear-stage buffer circuit 13. In general, the CDS circuit array 12 and the rear-stage buffer circuit 13 form the analog front-end circuit of the CMOS image sensor 10. As shown in FIG. 1, for convenience, a pixel sensor Pij represents a pixel sensor located at an $i^{th}$ column and a $j^{th}$ row of the pixel array 11, a CDS circuit CDS_i represents a CDS circuit coupled to all pixel sensors of the $j^{th}$ column, and the rear-stage buffer circuit 13 is coupled to all CDS circuits of the CDS circuit array 12. The pixel sensor Pij is an active pixel sensor with a four-transistor (4T) structure, and includes a photodiode PD, a transfer transistor TX, a reset transistor RX, a drive transistor DX and a select transistor SX. The photodiode PD is utilized for sensing incident light and accumulating photo charges that are generated due to the incident light. The transfer transistor TX is utilized for transferring the photo charges accumulated at the photodiode PD to a node FD according to a transfer control signal Tg1. The reset transistor RX is utilized for resetting a voltage of the node FD to a power supply voltage VDD according to a reset control signal Rst. The drive transistor DX is a source follower, and is utilized as a buffering amplifier for the select transistor SX. The select transistor SX is then utilized for successively outputting the reset signal and the light-sensing signal trough an output terminal PXO according to a row selection signal Rsel. Note that the transfer control signal Tg1, the reset control signal Rst and the row selection signal Rsel are generated by a row decoder, which is well known by those skilled in the art and not narrated herein.

The CDS circuit CDS_i is utilized for successively sampling the reset signals and the light-sensing signals outputted from all pixel sensors of the $i^{th}$ column, and includes sampling capacitors Cs and Cr, a constant current source I1, a reference voltage VR1 and eight switches 121~128 respectively controlled by control signals SS, SR, Sn and Scel. The rear-stage buffer circuit 13 is coupled to the CDS circuit CDS_i via input terminals VIP and VIN, and includes an operational amplifier OP1, capacitors C1 and C2, and six MOSFET switches 131~136 respectively controlled by control signals S1 and S2. The operation of the analog front-end circuit is briefly illustrated as follows. Firstly, the control signal Sn shorts the switches 123 and 124 to enable negative terminals of the sampling capacitors Cs and Cr to couple to the reference voltage VR1. Then, the control signals SR and SS successively short the switches 121 and 122 by two non-overlapping phases, so as to read out voltages of the reset signal and the light-sensing signal from the pixel sensor Pij and store the voltages into the sampling capacitors Cs and Cr. When the CMOS image sensor 10 is going to retrieve signals of the pixel sensor Pij, the switches 125~128 and the switches 131, 132 are simultaneously shorted by the CDS circuit CDS_i and the rear-stage buffer circuit 13 according to the control signals Scel and S2, so as to convert polarities of the sampling capacitors Cs and Cr and transfer electric charges stored in the sampling capacitors Cs and Cr to the capacitors C1 and C2 of the rear-stage buffer circuit 13 by virtually grounding two input terminals of the operational amplifier OP1. Hence, the CMOS image sensor 10 can output a voltage signal Vout corresponding to a voltage difference between the reset signal and the light-sensing signal through differential output terminals VOP and VON for driving rear-stage data processors. Certainly, before the electric charges stored in the sampling capacitors Cs and Cr are transferred to the capacitors C1 and C2, the rear-stage buffer circuit 13 can further short the switches 133~136 to clear remaining signals of last operation stored in the capacitors C1 and C2. As for related timing of the above control signals, please refer to FIG. 2.

For the analog front-end circuit of the CMOS image sensor, one chief design consideration is reduction of noise. The noise sources can be mainly classified into two kinds: thermal noise induced by operations of the sampling capacitors, and charge injection noise induced by switching the MOSFET switches. Since the thermal noise is proportional to KT/C (K: Boltzmann's constant, T: absolute temperature, and C: capacitance of sampling capacitor), the thermal noise can be improved by increasing the capacitance values of the sampling capacitors; and the charge injection noise can be lowered by reducing the number of the MOSFET switches and frequency of switching operations.

SUMMARY OF THE INVENTION

It is therefore an objective of the present invention to provide a correlation double sampling circuit for an image sensor.

According to the present invention, a complementary metal-oxide semiconductor (CMOS) image sensor is disclosed. The CMOS image sensor includes a pixel array and a plurality of correlation double sampling (CDS) circuits. The pixel array includes a plurality of pixel sensors arranged as a matrix. Each of the plurality of pixel sensors is utilized for sensing incident light and outputting a reset signal and a light-sensing signal in order. The plurality of CDS circuits are individually coupled to a column of the pixel array, and is utilized for sampling the reset signal and the light-sensing signal outputted by the column. Each of the plurality of CDS circuits includes a signal input terminal for receiving the reset signal and the light-sensing signal; a first sampling capacitor having a first terminal and a second terminal, the second terminal being coupled to a reference voltage terminal; a second sampling capacitor having a first terminal and a second terminal, the second terminal being coupled to the reference voltage terminal; a first switch, coupled between the signal input terminal and the first terminal of the first sampling capacitor, for providing electrical connection between the signal input terminal and the first sampling capacitor during a first phase to enable the first sampling capacitor to sample a voltage of the reset signal; a second switch, coupled between the signal input terminal and the first terminal of the second sampling capacitor, for providing electrical connection between the signal input terminal and the second sampling capacitor during a second phase to enable the second sampling capacitor to sample a voltage of the light-sensing signal; a third switch, coupled to the first terminal of the first sampling capacitor, for providing electrical connection between the first sampling capacitor and a first signal output terminal during a third phase to enable the first sampling capacitor to output the sampled voltage to the first signal output terminal; and a fourth switch, coupled to the first terminal of the second sampling capacitor, for providing electrical connection between the second sampling capacitor and a second signal output terminal during the third phase to enable the second sampling capacitor to output the sampled voltage to the second signal output terminal; wherein the first signal output terminal and the second signal output terminal are differential input terminals of a rear-stage buffer amplifier.

According to the present invention, a correlation double sampling (CDS) circuit of an image sensor, utilized for sampling a reset signal and a light-sensing signal outputted from a pixel column of the image sensor, is further disclosed. The CDS circuit includes a signal input terminal for receiving the reset signal and the light-sensing signal; a first sampling capacitor having a first terminal and a second terminal, the second terminal being coupled to a reference voltage terminal; a second sampling capacitor having a first terminal and a second terminal, the second terminal being coupled to the reference voltage terminal; a first switch, coupled between the signal input terminal and the first terminal of the first sampling capacitor, for providing electrical connection between the signal input terminal and the first sampling capacitor during a first phase to enable the first sampling capacitor to sample a voltage of the reset signal; a second switch, coupled between the signal input terminal and the first terminal of the second sampling capacitor, for providing electrical connection between the signal input terminal and the second sampling capacitor during a second phase to enable the second sampling capacitor to sample a voltage of the light-sensing signal; a third switch, coupled to the first terminal of the first sampling capacitor, for providing electrical connection between the first sampling capacitor and a first signal output terminal during a third phase to enable the first sampling capacitor to output the sampled voltage to the first signal output terminal; and a fourth switch, coupled to the first terminal of the second sampling capacitor, for providing electrical connection between the second sampling capacitor and a second signal output terminal during the third phase to enable the second sampling capacitor to output the sampled voltage to the second signal output terminal; wherein the first signal output terminal and the second signal output terminal are differential input terminals of a rear-stage buffer amplifier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
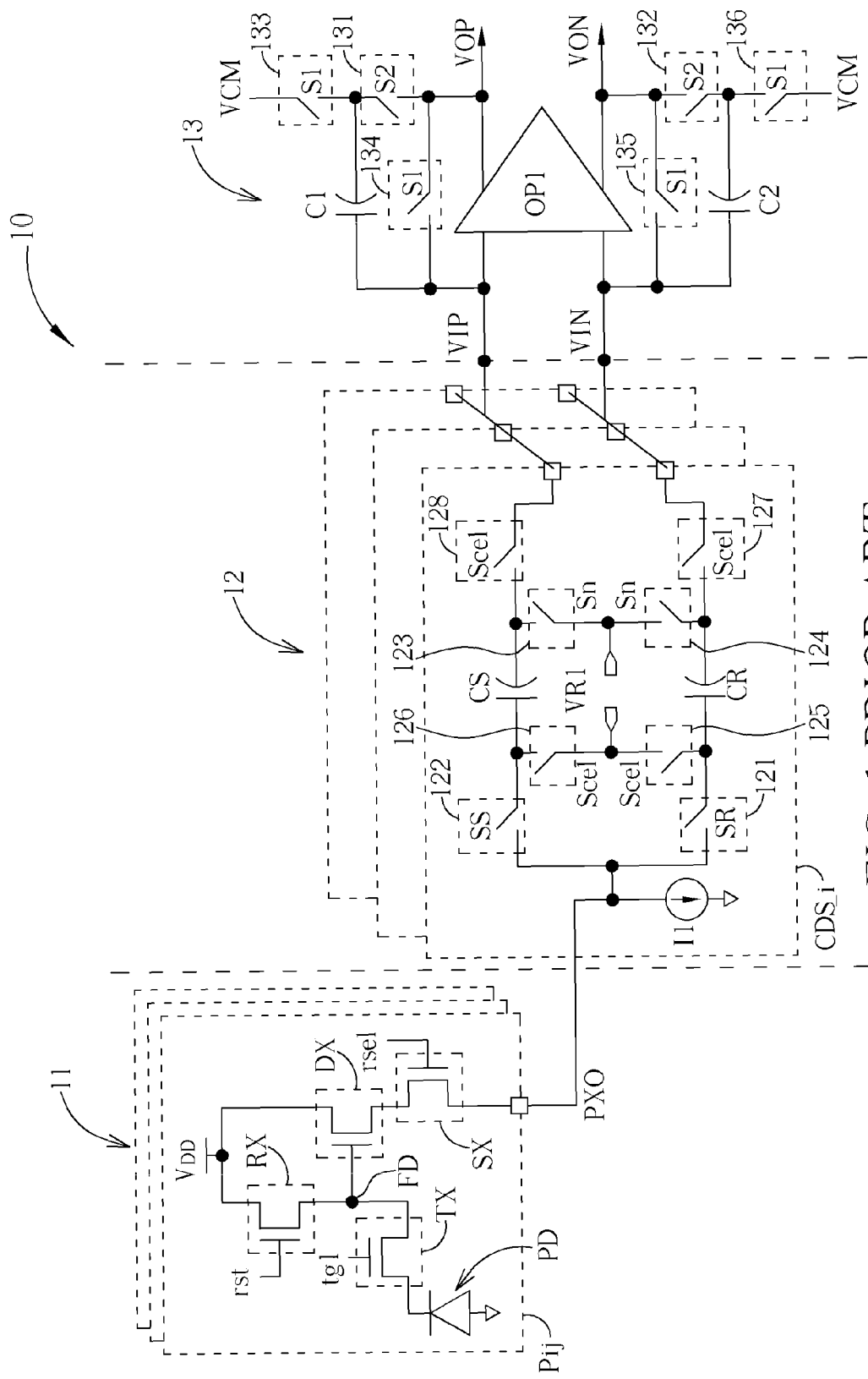
FIG. 1 is a schematic diagram of a conventional CMOS image sensor.
Figure 2:
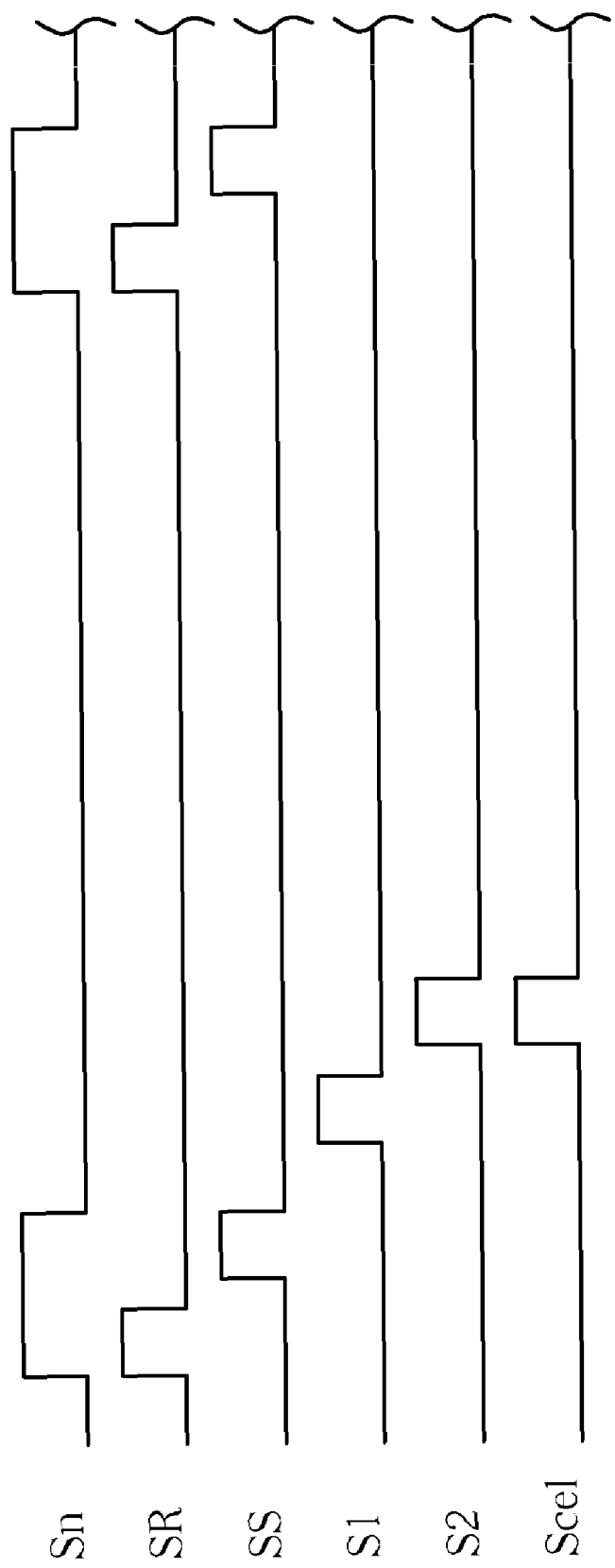
FIG. 2 illustrates related timing of control signals in FIG. 1.
Figure 3:
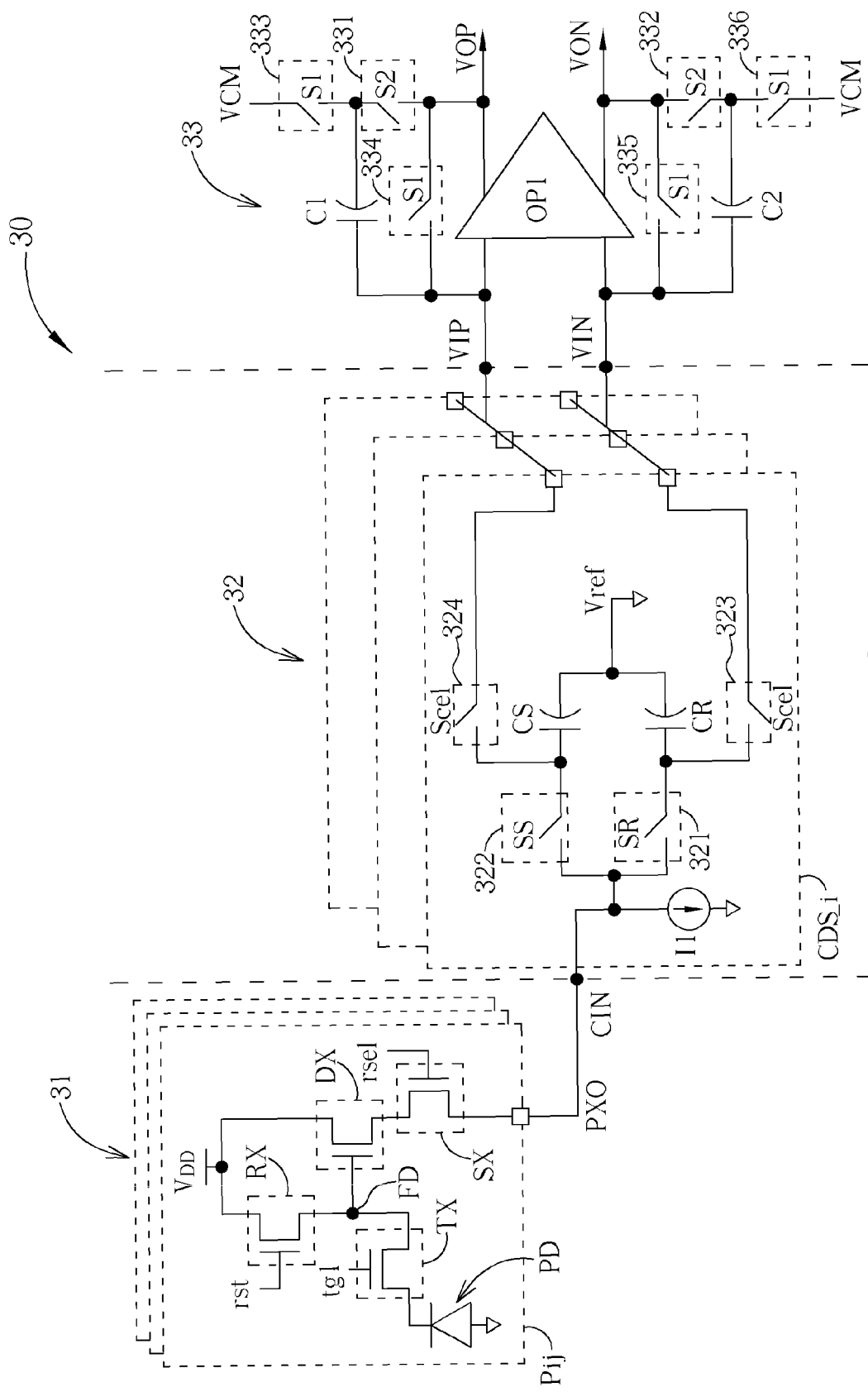
FIG. 3 is a schematic diagram of a CMOS image sensor according to an embodiment of the present invention.

Please refer to FIG. 3. FIG. 3 is a schematic diagram of a CMOS image sensor 30 according to an embodiment of the present invention. The CMOS image sensor 30 includes a pixel array 31, a correlation double sampling (CDS) circuit array 32 and a rear-stage buffer circuit 33. As shown in FIG. 3, for convenience, a pixel sensor Pij represents a pixel sensor located at an $i^{th}$ column and a $j^{th}$ row of the pixel array 31, a CDS circuit CDS_i represents a CDS circuit coupled to all pixel sensors of the $i^{th}$ column, and the rear-stage buffer circuit 33 is then coupled to all CDS circuits of the CDS circuit array 32. The pixel sensor Pij can be any kind of pixel sensor, such as an active pixel sensor with a four-transistor (4T) structure, and is utilized for sensing incident light and outputting a reset signal and a light-sensing signal. The CDS circuit CDS_i is utilized for successively sampling the reset signal and the light-sensing signal outputted from all pixel sensors of the $i^{th}$ column, and includes a constant current source I1, sampling capacitors Cs and Cr, switches 321, 322, 323, 324 and a reference voltage Vref. The constant current source I1 is utilized for providing a readout current of the pixel sensor Pij. The sampling capacitors Cs and Cr are respectively utilized for sampling voltages of the reset signal and the light-sensing signal. First ends of the sampling capacitors Cs and Cr are jointly coupled to the reference voltage Vref, while the other ends are coupled to a signal input terminal CIN via the switches 321 and 322 controlled by control signals SR and SS, respectively, and coupled to differential input terminals VIP and VIN of the rear-stage buffer circuit 33 via the switches 323 and 324 controlled by a control signal Scel. The rear-stage buffer circuit 33 includes an operational amplifier OP1, capacitors C1 and C2 and MOSFET switches 33, 332, 333, 334, 335 and 336 controlled by control signals S1 and S2, respectively. Related operations of the pixel sensor Pij and the rear-stage buffer circuit 33 are similar to the pixel sensor Pij and the rear-stage buffer circuit 13 in FIG. 1, and thus not narrated again herein.

Figure 4:
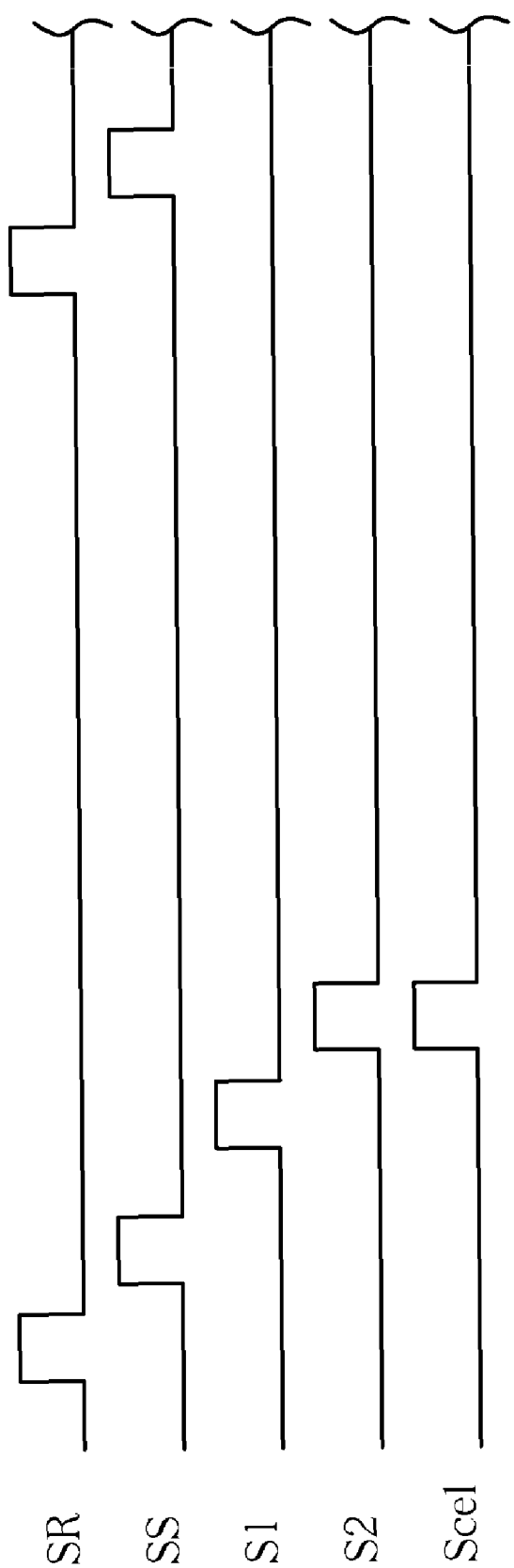
FIG. 4 illustrates related timing of control signals in FIG. 3.

When the pixel sensor Pij successively outputs the reset signal and the light-sensing signal, the switches 321 and 322 are shorted to couple the sampling capacitors Cr and Cs to the signal input terminal CIN according to high voltage levels of the control signals SR and SS, respectively, so as to enable the sampling capacitors Cr and Cs to sample voltages of the reset signal and the light-sensing signal. Then, the switches 323 and 324 are shorted to couple the sampling capacitors Cr and Cs to the differential input terminals VIP and VIN of the rear-stage buffer circuit 33 according to high voltage levels of the control signal Scel, so that voltages stored in the sampling capacitors Cr and Cs can be outputted to the differential input terminals VIP and VIN of the rear-stage buffer circuit 33, respectively. Note that the control signals SR, SS and Scel are non-overlapping clock signals, and before the voltages stored in the sampling capacitors Cs and Cr are transferred to the capacitors C1 and C2 of the rear-stage buffer circuit 13, the switches 333~336 can further be shorted to clear remaining signals of last operation stored in the capacitors C1 and C2. Therefore, the CMOS image sensor 30 of the present invention can output a voltage signal Vout corresponding to a voltage difference between the reset signal and the light-sensing signal through differential output terminals VOP and VON of the rear-stage buffer circuit 33 for driving rear-stage data processing circuits, such as analog to digital converters (ADCs) or image processors. As for related timing of the above control signals, please refer to FIG. 4.

Since the sampling capacitors in the prior art require polarity conversion in operation, only MIM (Metal-Insulator-Metal) capacitors or PIP (Polysilicon-Insulator-Polysilicon), which have low capacitance per unit area, can be utilized for realizing the sampling capacitors. By comparison, the operation of the CDS circuit of the present invention need not change polarities of the two sampling capacitors, so MOSFET capacitors having high capacitance per unit area can be used. Therefore, the present invention can provide high capacitance values in the same area for reducing impact of thermal noise (KT/C) induced by sampling operations, or can reduce chip sizes while keeping the same capacitance values. Meanwhile, in the present invention, fewer transistor switches are used in the CDS circuit, and thus charge injection noise caused by switching the MOSFET switches can also be reduced significantly.

Please note that, the rear-stage buffer circuit 33 is merely utilized as an exemplary illustration but not a limitation in the embodiment of the present invention, other ways to implement the rear-stage buffer circuit 33, such as two buffer circuits with a subtraction circuit, can certainly be made by those skilled in the art. Besides, the reference voltage Vref is preferred to be a ground voltage while MOSFET switches or CMOS transmission gates can be utilized for realizing the switches in the present invention.

As mentioned above, the present invention provides a CDS circuit for a CMOS image sensor, which not only has a simplified circuit structure and flexible ways for realization but also significantly reduces the thermal noise and the charge injection noise generated due to operation, for enhancing image quality of the CMOS image sensor.

Those skilled in the art will readily observe that numerous modifications and alterations of the device and method may be made while retaining the teachings of the invention.

What is claimed is:

1. A complementary metal-oxide semiconductor (CMOS) image sensor comprising:
   a pixel array comprising a plurality of pixel sensors arranged as a matrix, each of the plurality of pixel sensors utilized for sensing incident light and outputting a reset signal and a light-sensing signal in order; and
   a plurality of correlation double sampling (CDS) circuits, individually coupled to a column of the pixel array, for sampling the reset signal and the light-sensing signal outputted by the column, each of the plurality of CDS circuits comprising:
      a signal input terminal for receiving the reset signal and the light-sensing signal;
      a first sampling capacitor having a first terminal and a second terminal, the second terminal directly retrieving a reference voltage from a reference voltage terminal;
      a second sampling capacitor having a first terminal and a second terminal, the second terminal directly retrieving the reference voltage from the reference voltage terminal;
      a first switch, coupled between the signal input terminal and the first terminal of the first sampling capacitor, for providing electrical connection between the signal input terminal and the first sampling capacitor during a first phase to enable the first sampling capacitor to sample a voltage of the reset signal;
      a second switch, coupled between the signal input terminal and the first terminal of the second sampling capacitor, for providing electrical connection between the signal input terminal and the second sampling capacitor during a second phase to enable the second sampling capacitor to sample a voltage of the light-sensing signal;
      a third switch, being turned on during a third phase to provide electrical connection between the first terminal of the first sampling capacitor and a first signal output terminal to enable the first sampling capacitor to output the sampled voltage to the first signal output terminal through the turned-on third switch; and
      a fourth switch, being turned on during the third phase to provide electrical connection between the first terminal of the second sampling capacitor and a second signal output terminal to enable the second sampling capacitor to output the sampled voltage to the second signal output terminal through the turned-on fourth switch;
      wherein the first signal output terminal and the second signal output terminal are differential input terminals of a rear-stage buffer amplifier.

2. The CMOS image sensor of claim 1, wherein the first switch and the second switch are respectively controlled by a first clock signal and a second clock signal, the third switch and the fourth switch are simultaneously controlled by a third clock signal, and the first clock signal, the second clock signal and the third signal are non-overlapping phased clock signals.

3. The CMOS image sensor of claim 1, wherein the rear-stage buffer amplifier is a subtracter circuit.

4. The CMOS image sensor of claim 1, wherein the first switch, the second switch, the third switch and the fourth switch are MOSFET switches.

5. The CMOS image sensor of claim 1, wherein the first sampling capacitor and the second sampling capacitor are MOSFET capacitors.

6. The CMOS image sensor of claim 1, wherein the first sampling capacitor and the second sampling capacitor are PIP (Polysilicon-Insulator-Polysilicon) capacitors.

7. The CMOS image sensor of claim 1, wherein the first sampling capacitor and the second sampling capacitor are MIM (Metal-Insulator-Metal) capacitors.

8. The CMOS image sensor of claim 1, wherein the reference voltage terminal is a ground terminal.

9. A correlation double sampling (CDS) circuit of an image sensor for sampling a reset signal and a light-sensing signal outputted from a pixel column of the image sensor, the CDS circuit comprising:
   a signal input terminal for receiving the reset signal and the light-sensing signal;

a first sampling capacitor having a first terminal and a second terminal, the second terminal directly retrieving a reference voltage from a reference voltage terminal;

a second sampling capacitor having a first terminal and a second terminal, the second terminal directly retrieving the reference voltage from the reference voltage terminal;

a first switch, coupled between the signal input terminal and the first terminal of the first sampling capacitor, for providing electrical connection between the signal input terminal and the first sampling capacitor during a first phase to enable the first sampling capacitor to sample a voltage of the reset signal;

a second switch, coupled between the signal input terminal and the first terminal of the second sampling capacitor, for providing electrical connection between the signal input terminal and the second sampling capacitor during a second phase to enable the second sampling capacitor to sample a voltage of the light-sensing signal;

a third switch, being turned on during a third phase to provide electrical connection between the first terminal of the first sampling capacitor and a first signal output terminal to enable the first sampling capacitor to output the sampled voltage to the first signal output terminal through the turned-on third switch; and a fourth switch, being turned on during the third phase to provide electrical connection between the first terminal of the second sampling capacitor and a second signal output terminal to enable the second sampling capacitor to output the sampled voltage to the second signal output terminal through the turned-on fourth switch;

wherein the first signal output terminal and the second signal output terminal are differential input terminals of a rear-stage buffer amplifier.

10. The CDS circuit of claim 9, wherein the first switch and the second switch are respectively controlled by a first clock signal and a second clock signal, the third switch and the fourth switch are simultaneously controlled by a third clock signal, and the first clock signal, the second clock signal and the third signal are non-overlapping phased clock signals.

11. The CDS circuit of claim 9, wherein the rear-stage buffer amplifier is a subtracter circuit.

12. The CDS circuit of claim 9, wherein the first switch, the second switch, the third switch and the fourth switch are MOSFET switches.

13. The CDS circuit of claim 9, wherein the first sampling capacitor and the second sampling capacitor are MOSFET capacitors.

14. The CDS circuit of claim 9, wherein the first sampling capacitor and the second sampling capacitor are PIP (Polysilicon-Insulator-Polysilicon) capacitors.

15. The CDS circuit of claim 9, wherein the first sampling capacitor and the second sampling capacitor are MIM (Metal-Insulator-Metal) capacitors.

16. The CDS circuit of claim 9, wherein the reference voltage terminal is a ground terminal.

* * * * *